United States Patent
Zhang et al.

(10) Patent No.: US 10,505,474 B2
(45) Date of Patent: Dec. 10, 2019

(54) MOTOR STARTING STATE RECOGNITION METHOD AND DEVICE, AND MOTOR

(71) Applicant: GUANGDONG WELLING MOTOR MANUFACTURING CO., LTD., Foshan (CN)

(72) Inventors: Qian Zhang, Foshan (CN); Jie Sun, Foshan (CN)

(73) Assignee: GUANGDONG WELLING MOTOR MANUFACTURING CO., LTD., Foshan (CN)

( * ) Notice: Subject to any disclaimer, the term of this patent is extended or adjusted under 35 U.S.C. 154(b) by 0 days.

(21) Appl. No.: 16/177,390

(22) Filed: Oct. 31, 2018

(65) Prior Publication Data

US 2019/0074782 A1 Mar. 7, 2019

Related U.S. Application Data (63) Continuation of application No. PCT/CN2017/093043, filed on Jul. 14, 2017.

(51) Int. Cl.
*H02P 1/00* (2006.01)
*H02P 6/20* (2016.01)
*H02P 6/182* (2016.01)

(52) U.S. Cl.
CPC ............ *H02P 6/20* (2013.01); *H02P 6/182* (2013.01); *H02P 2203/09* (2013.01)

(58) Field of Classification Search
USPC ............ 318/101, 275, 277, 430, 431, 435
See application file for complete search history.

(56) References Cited

U.S. PATENT DOCUMENTS

| | | | | |
|---|---|---|---|---|
| 4,338,115 A | * | 7/1982 | Farkas | C03B 9/41 65/158 |
| 5,187,419 A | * | 2/1993 | DeLange | H02P 3/18 318/400.2 |
| 2010/0141199 A1 | * | 6/2010 | Shimada | H02P 8/18 318/696 |
| 2014/0130066 A1 | * | 5/2014 | Chung | G11B 17/056 720/606 |
| 2015/0137713 A1 | * | 5/2015 | Barsilai | H02P 25/032 318/114 |

* cited by examiner

*Primary Examiner* — Bentsu Ro
(74) *Attorney, Agent, or Firm* — Scully Scott Murphy & Presser (57) ABSTRACT

A motor starting state recognition method and device, and a motor. The method includes sampling the counter electromotive forces of any two phases of a motor, and calculating a linear counter electromotive force of the motor according to the counter electromotive forces of the two phases, acquiring a polarity flag bit of the motor, and determining the starting state of the motor according to the polarity flag bit and the linear counter electromotive force. The state of a motor before starting can be recognized effectively using the method, so that the problem where a motor may not be started normally or the success rate of starting is low under the condition of a favorable/dead wind is effectively solved, and the problem where a motor becomes severely worn out and has a shorter service life after frequent starting due to starting failure is avoided. Moreover, the method is simple and highly accurate, and the success rate and reliability of system starting are effectively improved.

15 Claims, 4 Drawing Sheets

MOTOR STARTING STATE RECOGNITION METHOD AND DEVICE, AND MOTOR

CROSS-REFERENCE TO RELATED APPLICATIONS

This application is a continuation of International Application PCT/CN2017/093043, filed on Jul. 14, 2017, which claims priority to and the benefit of Chinese Patent Application No. 201610616430.5 filed with the Chinese Patent Office on Jul. 28, 2016, the entire contents of which are incorporated herein by reference.

FIELD

The present disclosure relates to the field of a motor technology, and more particularly to a method and an apparatus for identifying a starting state of a motor, and a motor.

BACKGROUND

In a motor control system, with regard to different states which a motor is in before starting, different starting strategies can be applied to control the motor to complete the starting. For example, if the motor is in a stationary state when it starts, it, the motor may start under a normal starting voltage; if the motor is in a downwind state when it starts, the starting voltage may be smaller than the normal starting voltage; if the motor is in an upwind state when it starts, the starting voltage may be greater than the normal starting voltage.

However, when a position without a sensor is used, it is difficult to accurately determine the state of the motor before starting and a starting rotation speed, such that it is difficult to apply a corresponding starting strategy according to the state when the motor starts. In the related art, a detection of back electromotive forces of three phases is used to identify a rotation speed and a rotation direction of the motor before starting, but the assembly for the detection has a high cost. When a detection of back electromotive forces of two phases is used, the cost is relatively low, but difficulties remain.

SUMMARY

The present disclosure seeks to solve at least one of the problems that exist in the related art to at least some extent.

Accordingly, one embodiment of the present disclosure is to provide a method for identifying a starting state of a motor. The method is applied to effectively identify a state of a motor before starting, thus solving a problem that the motor may not start normally or a success rate of starting the motor is low in a downwind or upwind state may be effectively solved and avoiding a problem that the motor is seriously worn and has a shorter service life due to starting failure and frequent starting. Moreover, the method is simple and highly accurate, and the success rate and reliability of starting system are effectively improved.

Another embodiment of the present disclosure is to provide an apparatus for identifying a starting state of a motor.

Another embodiment of the present disclosure is to provide a motor.

Another embodiment of the present disclosure is to provide a device.

Another embodiment of the present disclosure is to provide a computer storage medium.

Embodiments of the present disclosure provide a method for identifying a starting state of a motor, including: sampling back electromotive forces of any two phases of the motor and calculating a line back electromotive force according to the back electromotive forces of the two phases; acquiring a polarity flag of the motor; and determining the starting state of the motor according to the polarity flag and the line back electromotive force.

With the method of embodiments of the present disclosure, firstly, the back electromotive forces of any two phases of the motor are taken as samples and the line back electromotive force is calculated according to the back electromotive forces of the two phases. Then, the polarity flag of the motor is acquired and the starting state of the motor is determined according to the polarity flag and the line back electromotive force. The method is applied to effectively identify the state of the motor before starting, thus solving a problem that the motor may not start normally or a success rate of starting the motor is low in a downwind or upwind state may be effectively solved and avoiding a problem that the motor is seriously worn and has a shorter service life due to starting failure and frequent starting. Moreover, the method is simple and highly accurate, and the success rate and reliability of starting system are effectively improved.

In an embodiment of the present disclosure, determining the starting state of the motor according to the polarity flag and the line back electromotive force includes: calculating a sum of the back electromotive forces of the two phases as a SumP if the polarity flag is positive and the line back electromotive force is smaller than 0 in a first pre-set period; calculating a sum of the back electromotive forces of the two phases as a SumN if the polarity flag is negative and the line back electromotive force is greater than 0 in a second pre-set period, in which the second pre-set period is equal to the first pre-set period; determining the starting state of the motor according to a magnitude relationship between the SumP and the SumN.

In an embodiment of the present disclosure, determining the starting state of the motor according to a magnitude relationship between the SumP and the SumN includes: determining that the motor is in a downwind starting state if the SumP is greater than the SumN; determining that the motor is in an upwind starting state if the SumP is smaller than the SumN.

In an embodiment of the present disclosure, the method for identifying a starting state of a motor further includes calculating a starting rotation speed of the motor according to a sampling frequency and the number of sampled samples in a third pre-set period or the number of sampled samples in a fourth pre-set period, to identify a rotation speed of the motor before the motor is in the downwind starting state or the upwind starting state.

In an embodiment of the present disclosure, the starting rotation speed of the motor is calculated with a following formula:

$$\text{Speed} = 1/(N*(1/fs)),$$

in which Speed is the starting rotation speed of the motor, N is the number of the sampled samples, and fs is the sampling frequency.

In an embodiment of the present disclosure, determining the starting state of the motor according to the polarity flag and the line back electromotive force further includes: determining that the motor is in a stationary starting state if an absolute value of the line back electromotive force is smaller than a first pre-set value in a fifth pre-set period.

Embodiments of the present disclosure provide an apparatus, including: a sampling device configured to sample back electromotive forces of any two phases of the motor, a first calculating device coupled to the sampling device and configured to calculate a line back electromotive force according to the back electromotive forces of the two phases; an acquiring device configured to acquire a polarity flag of the motor; and a determining device coupled to the first calculating device and the acquiring device respectively and configured to determine the starting state of the motor according to the polarity flag and the line back electromotive force.

With the apparatus of embodiments of the present disclosure, the back electromotive forces of any two phases of the motor are taken as samples by the sampling device and the line back electromotive force is calculated according to the back electromotive forces of the two phases by the first calculating device. Then, the polarity flag of the motor is acquired by the acquiring device. Finally, the starting state of the motor is determined according to the polarity flag and the line back electromotive force by the determining device. The apparatus is used to effectively identify the state of the motor before starting, thus solving a problem that the motor may not start normally or a success rate of starting the motor is low in a downwind or upwind state may be effectively solved and avoiding a problem that the motor is seriously worn and has a shorter service life due to starting failure and frequent starting. Moreover, the identification accuracy is high, and the success rate and reliability of starting system are effectively improved.

In an embodiment of the present disclosure, when the starting state of the motor is determined according to the polarity flag and the line back electromotive force by the determining device, the determining device is configured to: calculate a sum of the back electromotive forces of the two phases as a SumP if the polarity flag is positive and the line back electromotive force is smaller than 0 in a first pre-set period; calculate a sum of the back electromotive forces of the two phases as a SumN if the polarity flag is negative and the line back electromotive force is greater than 0 in a second pre-set period, in which the second pre-set period is equal to the first pre-set period; determine the starting state of the motor according to a magnitude relationship between the SumP and the SumN.

In an embodiment of the present disclosure, when the starting state of the motor is determined according to the magnitude relationship between the SumP and the SumN by the determining device, the determining device is configured to: determine that the motor is in a downwind starting state if the SumP is greater than the SumN; determine that the motor is in an upwind starting state if the SumP is smaller than the SumN.

In an embodiment of the present disclosure, the apparatus for identifying a starting state of a motor further includes a second calculating device coupled to the sampling device and configured to calculate a starting rotation speed of the motor according to a sampling frequency and the number of sampled samples in a third pre-set period or the number of sampled samples in a fourth pre-set period, to identify a rotation speed of the motor before the motor is in the downwind starting state or the upwind starting state.

In an embodiment of the present disclosure, the second calculating device is configured to calculate the starting rotation speed of the motor with a following formula:

$$Speed = 1/(N*(1/fs)),$$

in which Speed is the starting rotation speed of the motor, N is the number of the sampled samples, and fs is the sampling frequency.

In an embodiment of the present disclosure, the determining device is further configured to determine that the motor is in a stationary starting state if an absolute value of the line back electromotive force is smaller than a first pre-set value in a fifth pre-set period.

In addition, embodiments of the present disclosure also provide a motor including the apparatus for identifying the starting state of the motor described above.

With the motor of embodiments of the present disclosure, the state of the motor before starting may be effectively identified by the apparatus for identifying the starting state of the motor described above, thus solving a problem that the motor may not start normally or a success rate of starting the motor is low in a downwind or upwind state may be effectively solved and avoiding a problem that the motor is seriously worn and has a shorter service life due to starting failure and frequent starting. Moreover, the identification accuracy is high, and the success rate and reliability of starting system are effectively improved.

Embodiments of the present disclosure provide a device, including one or more processors; a memory; one or more programs stored in the memory that, when executed by the one or more processors, cause the one or more processors to perform a method for identifying a starting state of a motor described above.

With the device of embodiments of the present disclosure, by sampling back electromotive forces of any two phases of the motor and calculating a line back electromotive force according to the back electromotive forces of the two phases, acquiring a polarity flag of the motor, and determining the starting state of the motor according to the polarity flag and the line back electromotive force, the state of the motor before starting may be effectively identified, thus solving a problem that the motor may not start normally or a success rate of starting the motor is low in a downwind or upwind state may be effectively solved and avoiding a problem that the motor is seriously worn and has a shorter service life due to starting failure and frequent starting. Moreover, the method is simple and highly accurate, and the success rate and reliability of starting system are effectively improved.

Embodiments of the present disclosure also provide a computer storage medium having stored therein one or more programs that, when executed by a device, cause the device to perform a method for identifying a starting state of a motor described above.

With the computer storage medium of embodiments of the present disclosure, by sampling back electromotive forces of any two phases of the motor and calculating a line back electromotive force according to the back electromotive forces of the two phases, acquiring a polarity flag of the motor, and determining the starting state of the motor according to the polarity flag and the line back electromotive force, the state of the motor before starting may be effectively identified, thus solving a problem that the motor may not start normally or a success rate of starting the motor is low in a downwind or upwind state may be effectively solved and avoiding a problem that the motor is seriously worn and has a shorter service life due to starting failure and frequent starting. Moreover, the method is simple and highly accurate, and the success rate and reliability of starting system are effectively improved.

DETAILED DESCRIPTION

Embodiments of the present disclosure are described in detail below, examples of which are illustrated in the drawings. The same or similar elements are denoted by same reference numerals in different drawings unless indicated otherwise. The embodiments described herein with reference to drawings are explanatory, and used to generally understand the present disclosure. The embodiments shall not be construed to limit the present disclosure.

A method and an apparatus for identifying a starting state of a motor and a motor provided by embodiments of the present disclosure are described below with reference to the drawings.

Figure 1:
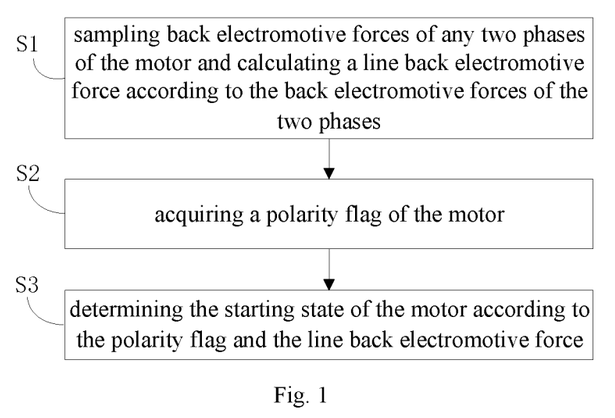
FIG. 1 is a flow chart of a method for identifying a starting state of a motor according to an embodiment of the present disclosure.

FIG. 1 is a flow chart of a method for identifying a starting state of a motor according to an embodiment of the present disclosure. As shown in FIG. 1, the method for identifying a starting state of a motor includes following steps.

At S1, back electromotive forces of any two phases of the motor are taken as samples and a line back electromotive force is calculated according to the back electromotive forces of the two phases.

Figure 2:
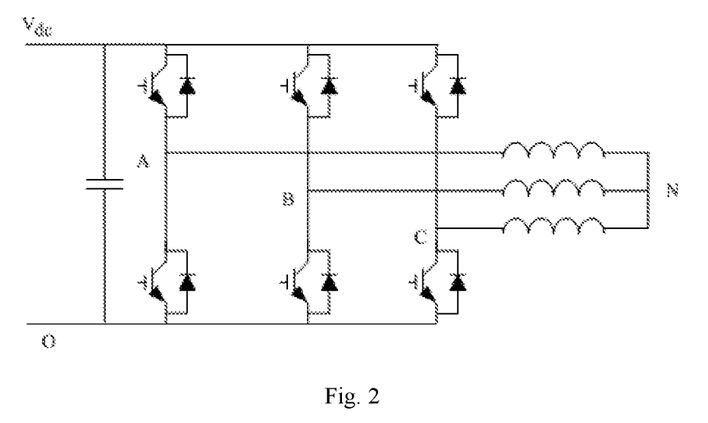
FIG. 2 is a topological graph of motor control according to an embodiment of the present disclosure.
Figure 3:
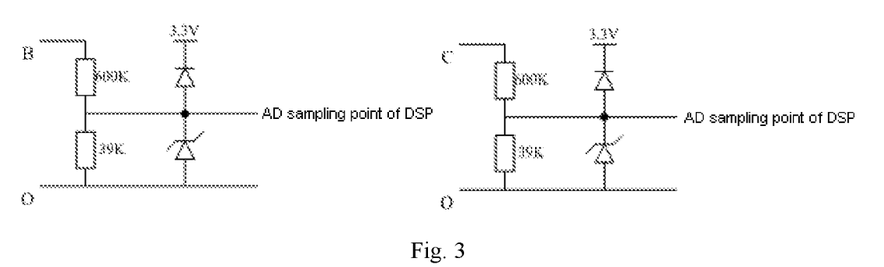
FIG. 3 is a circuit diagram of sampling back electromotive forces according to an embodiment of the present disclosure.

In one embodiment, as shown in FIG. 2 and FIG. 3, a three-phase brushless direct current (DC) motor is taken as an example, a back electromotive force Ev of a phase B and a back electromotive force Ew of a phase C are sampled according to voltage dividing resistors. Then, a line back electromotive force Evw is calculated according to the back electromotive force Ev of the phase B and the back electromotive force Ew of the phase C.

At S2, a polarity flag of the motor is acquired.

It should be understood that the polarity flag is a flag set for determining the starting state of the motor.

At S3, the starting state of the motor is determined according to the polarity flag and the line back electromotive force.

In an embodiment of the present disclosure, determining the starting state of the motor according to the polarity flag and the line back electromotive force includes: calculating a sum of the back electromotive forces of the two phases as a SumP if the polarity flag is positive and the line back electromotive force is smaller than 0 in a first pre-set period; calculating a sum of the back electromotive forces of the two phases as a SumN if the polarity flag is negative and the line back electromotive force is greater than 0 in a second pre-set period, in which the second pre-set period is equal to the first pre-set period; determining the starting state of the motor according to a magnitude relationship between the SumP and the SumN.

Further, determining the starting state of the motor according to a magnitude relationship between the SumP and the SumN includes: determining that the motor is in a downwind starting state if the SumP is greater than the SumN; determining that the motor is in an upwind starting state if the SumP is smaller than the SumN.

In one embodiment, if the polarity flag of the motor is positive and the line back electromotive force Evw of the motor is less than 0 in the first pre-set time period T1, the sum of the back electromotive forces Ev and Ew of the two phases of the motor is calculated as SumP, and the polarity flag is set to be negative. On the contrary, if the polarity flag of the motor is negative and the line back electromotive force Evw of the motor is greater than 0 in the second pre-set period T2, the sum of the back electromotive forces Ev and Ew of the two phases of the motor is calculated as SumN, and the polarity flag is set to be positive. Then, it is judged whether the SumP is greater than the SumN. If the SumP is greater than the SumN, it is determined that the motor is in the downwind starting state; if the SumP is smaller than the SumN, it is determined that the motor is in the upwind starting state. Therefore, the state of the motor before starting may be effectively identified, and different strategies may be applied to control the motor to start according to the state of the motor before starting to complete the starting of the motor.

In an embodiment of the present disclosure, the method for identifying a starting state of a motor further includes calculating a starting rotation speed of the motor according to a sampling frequency and the number of sampled samples in a third pre-set period or the number of sampled samples in a fourth pre-set period, to identify a rotation speed of the motor before the motor is in the downwind starting state or the upwind starting state.

In an embodiment of the present disclosure, the starting rotation speed of the motor is calculated with a following formula:

$$\text{Speed} = 1/(N*(1/fs))  \quad (1),$$

in which Speed is the starting rotation speed of the motor, N is the number of the sampled samples, and fs is the sampling frequency.

In one embodiment, when the polarity flag of the motor is positive and the line back electromotive force Evw of the motor is less than 0 in the first pre-set period T1, a starting rotation speed Speed1 of the motor is calculated by the above formula (1) according to the sampling frequency fs and the number of the sampled samples in the third pre-set period T3 (T1<T3). When the polarity flag of the motor is negative and the line back electromotive force Evw of the motor is greater than 0 in the second pre-set period T2, a starting rotation speed Speed2 of the motor is also calculated by the above formula (1) according to the sampling frequency fs and the number of sampling samples in the fourth pre-set period T4 (T2<T4). If it is determined that the motor is in the downwind starting state according to the magnitude relationship between the SumP and the SumN, the starting rotation speed of the motor is Speed1. If it is determined that the motor is in the upwind starting state, the starting rotation speed of the motor is Speed2.

In an embodiment of the present disclosure, determining the starting state of the motor according to the polarity flag and the line back electromotive force further includes: determining that the motor is in a stationary starting state if an absolute value of the line back electromotive force is smaller than a first pre-set value in a fifth pre-set period. In one embodiment, the fifth pre-set period is greater than the third pre-set period and the fourth pre-set period, and the fifth pre-set period and the first pre-set value may be calibrated according to actual conditions.

In other words, if the line back electromotive force Evw of the motor is relatively small for the fifth pre-set period T5, the motor is in the stationary starting state, and the starting rotation speed and angle of the motor are both zero.

Figure 4A:
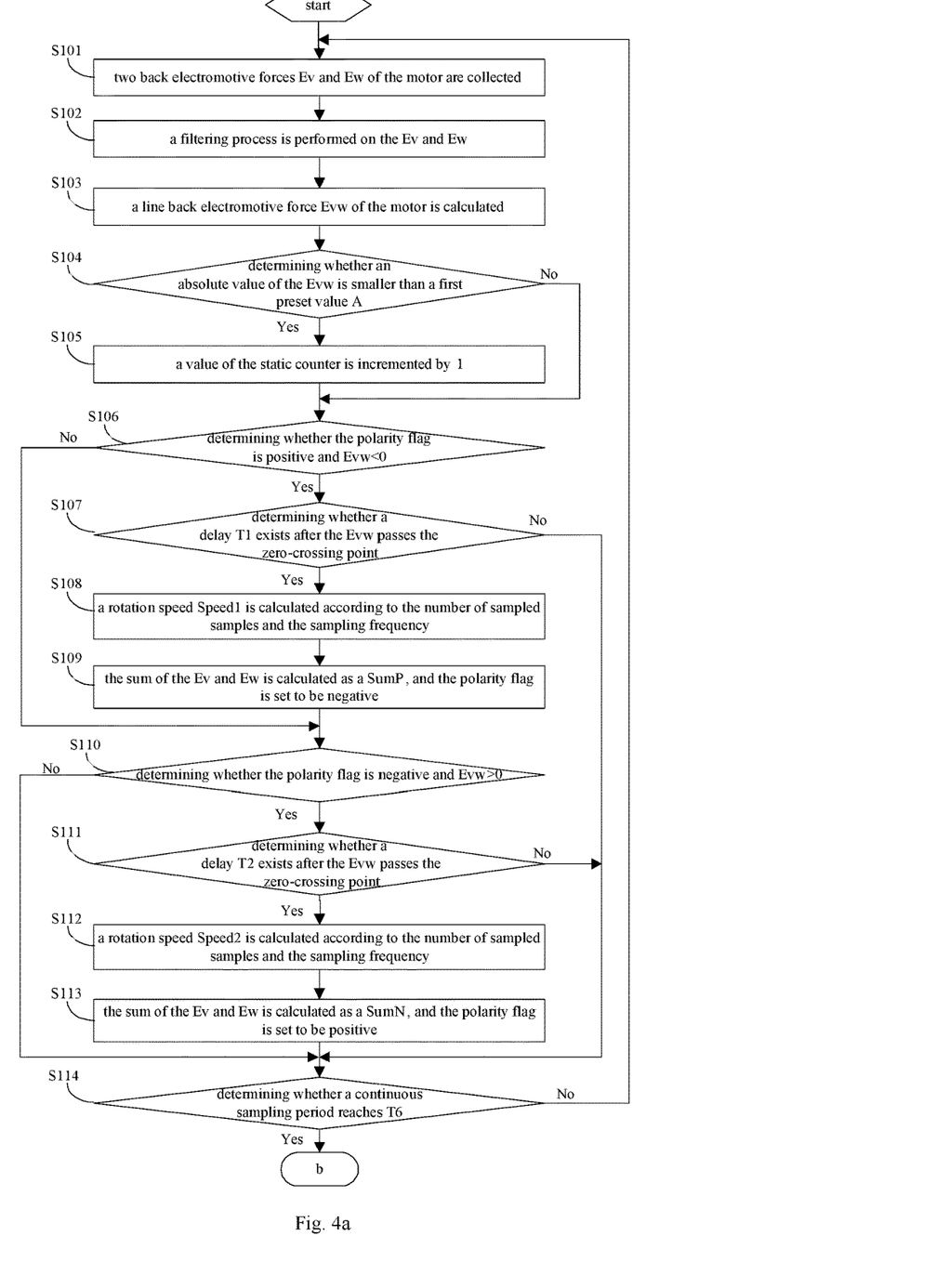
FIG. 4a and FIG. 4b are a flow chart of a method for identifying a starting state of a motor according to an embodiment of the present disclosure.
Figure 4B:
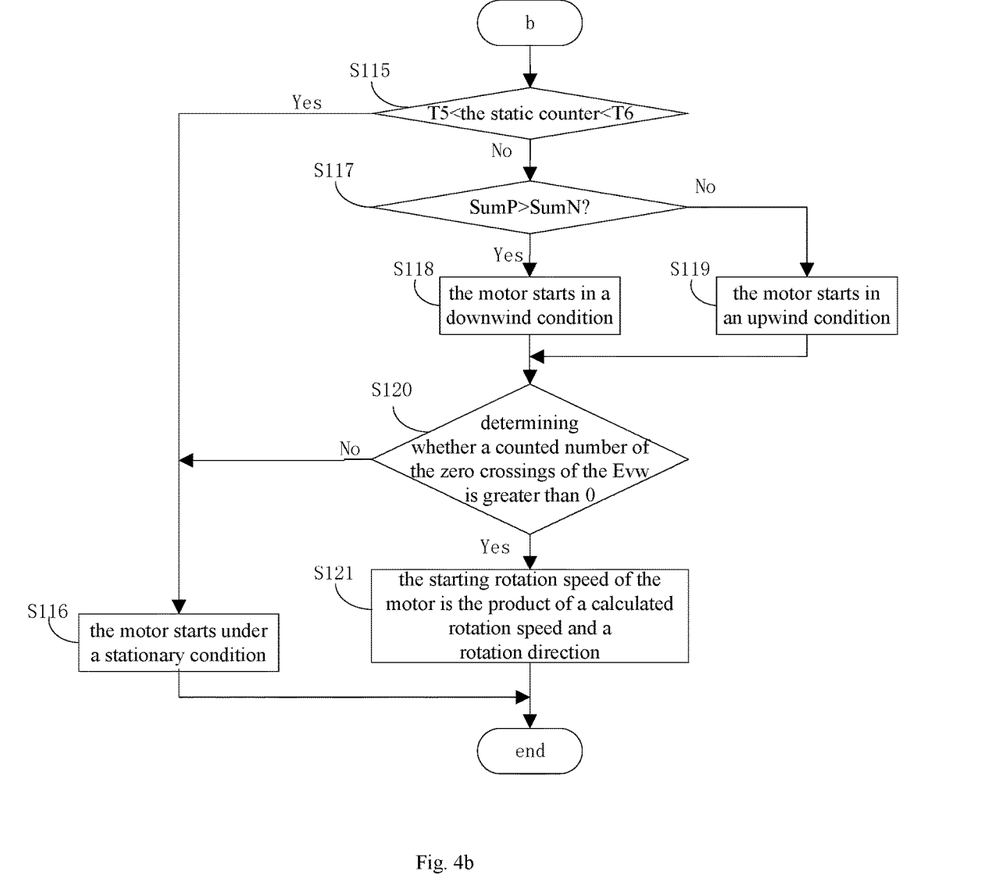

A method for identifying a starting state of a motor of the embodiments of the present disclosure will be described below with reference to a following example of the present disclosure. As shown in FIG. 4a and FIG. 4b, the method for identifying the starting state of the motor may include the following steps.

At S101, two back electromotive forces Ev and Ew of the motor are collected.

At S102, a filtering process is performed on the Ev and Ew.

At S103, a line back electromotive force Evw of the motor is calculated.

At S104, it is determined whether an absolute value of the Evw is smaller than a first pre-set value A. If yes, S105 is performed; if no, S106 is performed.

At S105, a value of the static counter is incremented by 1.

At S106, it is determined whether the polarity flag is positive and Evw<0. If yes, S107 is performed; if no, S110 is performed.

At S107, it is determined whether a delay T1 exists after the Evw passes the zero-crossing point. If yes, S108 is performed; if no, S114 is performed.

At S108, a rotation speed Speed1 is calculated according to the number of sampled samples and the sampling frequency.

At S109, the sum of the Ev and Ew is calculated as a SumP, and the polarity flag is set to be negative.

At S110, it is determined whether the polarity flag is negative and Evw>0. If yes, S111 is performed; if no, S114 is performed.

At S111, it is determined whether a delay T2 exists after the Evw passes the zero-crossing point, in which T2=T1. If yes, S112 is performed; if no, S114 is performed.

At S112, a rotation speed Speed2 is calculated according to the number of sampled samples and the sampling frequency.

At S113, the sum of the Ev and Ew is calculated as a SumN, and the polarity flag is set to be positive.

At S114, it is determined whether a continuous sampling period reaches T6. If yes, S115 is performed; if no, S101 is performed.

At S115, it is determined whether the time of the static counter is greater than T5 and smaller than T6. If yes, S116 is performed; if no, S117 is performed.

At S116, the motor starts under a stationary condition.

At S117, it is determined whether SumP>SumN. If yes, S118 is performed; if no, S119 is performed.

At S118, the motor starts in a downwind condition.

At S119, the motor starts in an upwind condition.

At S120: it is determined whether a counted number of the zero crossings of the Evw is greater than 0. If yes, S121 is performed; if no, S116 is performed.

At S121, the starting rotation speed of the motor is the product of a calculated rotation speed and a rotation direction.

In conclusion, with the method for identifying the starting state of the motor of the embodiments of the present disclosure, firstly, the back electromotive forces of any two phases of the motor are taken as samples and the line back electromotive force is calculated according to the back electromotive forces of the two phases. Then, the polarity flag of the motor is acquired and the starting state of the motor is determined according to the polarity flag and the line back electromotive force. The method is applied to effectively identify the state of the motor before starting, thus solving a problem that the motor may not start normally or a success rate of starting the motor is low in a downwind or upwind state may be effectively solved and avoiding a problem that the motor is seriously worn and has a shorter service life due to starting failure and frequent starting. Moreover, the method is simple and highly accurate, and the success rate and reliability of starting system are effectively improved.

Figure 5:
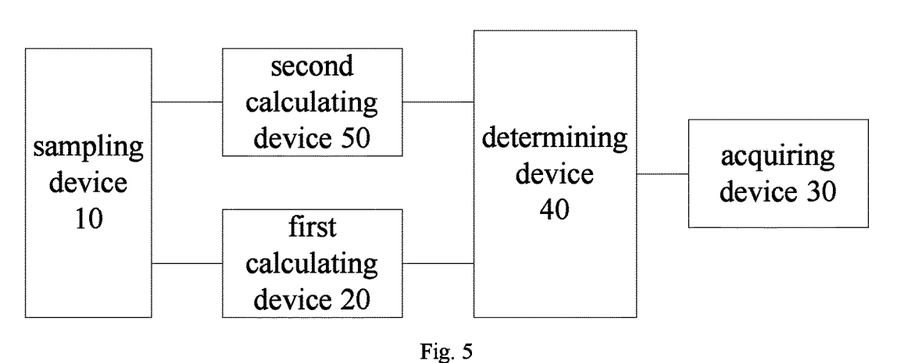
FIG. 5 is a block diagram of an apparatus for identifying a starting state of a motor according to an embodiment of the present disclosure.

FIG. 5 is a block diagram of an apparatus for identifying a starting state of a motor according to an embodiment of the present disclosure. As shown in FIG. 5, the apparatus for identifying a starting state of a motor includes a sampling device 10, a first calculating device 20, an acquiring device 30 and a determining device 40.

In one embodiment, the sampling device 10 is configured to sample back electromotive forces of any two phases of the motor. The first calculating device 20 is coupled to the sampling device 10 and is configured to calculate a line back electromotive force according to the back electromotive forces of the two phases. The acquiring device 30 is configured to acquire a polarity flag of the motor. The determining device 40 is coupled to the first calculating device 20 and the acquiring device 30 respectively and is configured to determine the starting state of the motor according to the polarity flag and the line back electromotive force.

In an embodiment of the present disclosure, when the starting state of the motor is determined according to the polarity flag and the line back electromotive force by the determining device 40, the determining device 40 is configured to: calculate a sum of the back electromotive forces of the two phases as a SumP if the polarity flag is positive and the line back electromotive force is smaller than 0 in a first pre-set period; calculate a sum of the back electromotive forces of the two phases as a SumN if the polarity flag is negative and the line back electromotive force is greater than 0 in a second pre-set period, in which the second pre-set period is equal to the first pre-set period; determine the starting state of the motor according to a magnitude relationship between the SumP and the SumN.

Further, when the starting state of the motor is determined according to the magnitude relationship between the SumP and the SumN by the determining device 40, the determining device 40 is configured to: determine that the motor is in a downwind starting state if the SumP is greater than the SumN; determine that the motor is in an upwind starting state if the SumP is smaller than the SumN.

In one embodiment, as shown in FIG. 2 and FIG. 3, a three-phase brushless direct current motor is taken as an example, a back electromotive force Ev of a phase B and a back electromotive force Ew of a phase C are sampled according to voltage dividing resistors. Then, a line back electromotive force Evw is calculated by the first calculating device 20 according to the back electromotive force Ev of the phase B and the back electromotive force Ew of the phase C.

If the polarity flag of the motor acquired by the acquiring device 30 is positive and the line back electromotive force Evw of the motor is less than 0 in the first pre-set time period T1, the sum of the back electromotive forces Ev and Ew of the two phases of the motor is calculated as SumP by the determining device 40, and the polarity flag is set to be negative. On the contrary, if the polarity flag of the motor is negative and the line back electromotive force Evw of the motor is greater than 0 in the second pre-set period T2, the sum of the back electromotive forces Ev and Ew of the two phases of the motor is calculated as SumN by the determining device 40, and the polarity flag is set to be positive. Then, it is judged by the determining device 40 whether the SumP is greater than the SumN. If the SumP is greater than the SumN, it is determined that the motor is in the downwind starting state; if the SumP is smaller than the SumN, it is determined that the motor is in the upwind starting state. Therefore, the state of the motor before starting may be effectively identified, and different strategies may be applied to control the motor to start according to the state of the motor before starting to complete the starting of the motor.

In an embodiment of the present disclosure, as shown in FIG. 5, the apparatus for identifying the starting state of the motor described above further includes a second calculating device 50 coupled to the sampling device and configured to calculate a starting rotation speed of the motor according to a sampling frequency and the number of sampled samples in a third pre-set period or the number of sampled samples in a fourth pre-set period, to identify a rotation speed of the motor before the motor is in the downwind starting state or the upwind starting state. In one embodiment, the third pre-set period is greater than the first pre-set period, the fourth pre-set period is greater than the second pre-set period. The second calculating device 50 is configured to calculate the starting rotation speed of the motor with above formula (1).

In one embodiment, when the polarity flag of the motor is positive and the line back electromotive force Evw of the motor is less than 0 in the first pre-set period T1, a starting rotation speed Speed1 of the motor is calculated by the second calculating device 50 with the above formula (1) according to the sampling frequency fs and the number of the sampled samples in the third pre-set period T3 (T1<T3). When the polarity flag of the motor is negative and the line back electromotive force Evw of the motor is greater than 0 in the second pre-set period T2, a starting rotation speed Speed2 of the motor is also calculated by the second calculating device 50 with the above formula (1) according to the sampling frequency fs and the number of sampling samples in the fourth pre-set period T4 (T2<T4). If it is determined that the motor is in the downwind starting state according to the magnitude relationship between the SumP and the SumN, the starting rotation speed of the motor is Speed1. If it is determined that the motor is in the upwind starting state, the starting rotation speed of the motor is Speed2.

In an embodiment of the present disclosure, the determining device 40 is further configured to determine that the motor is in a stationary starting state if an absolute value of the line back electromotive force is smaller than a first pre-set value in a fifth pre-set period. In one embodiment, the fifth pre-set period is greater than the third pre-set period and the fourth pre-set period.

In other words, if the line back electromotive force Evw of the motor is relatively small for the fifth pre-set period T5, the motor is in the stationary starting state, and the starting rotation speed and angle of the motor are both zero.

The process for identifying the starting state of the motor may refers to FIG. 4a and FIG. 4b, which is no more described in detail here.

With the apparatus of embodiments of the present disclosure, the back electromotive forces of any two phases of the motor are taken as samples by the sampling device and the line back electromotive force is calculated according to the back electromotive forces of the two phases by the first calculating device. Then, the polarity flag of the motor is acquired by the acquiring device. Finally, the state of the motor before starting including the stationary starting state, the downwind starting state and the upwind starting state is effectively identified by the determining device according to the polarity flag and the line back electromotive force, such that a corresponding starting strategy may be selected to start the motor according to different starting states, thus solving a problem that the motor may not start normally or a success rate of starting the motor is low in a downwind or upwind state may be effectively solved and avoiding a problem that the motor is seriously worn and has a shorter service life due to starting failure and frequent starting. Moreover, the identification accuracy is high, and the success rate and reliability of starting system are effectively improved.

Moreover, embodiments of the present disclosure also provide a motor, including the apparatus for identifying a starting state of a motor described above.

With the motor of embodiments of the present disclosure, the state of the motor before starting may be effectively identified by the apparatus for identifying the starting state of the motor described above, thus solving a problem that the motor may not start normally or a success rate of starting the motor is low in a downwind or upwind state may be effectively solved and avoiding a problem that the motor is seriously worn and has a shorter service life due to starting failure and frequent starting. Moreover, the identification accuracy is high, and the success rate and reliability of starting system are effectively improved.

It should be understood that each part of the present disclosure may be realized by the hardware, software, firmware or their combination. In the above embodiments, steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application integrated circuit having an appropriate combination logic gate circuit, a programmable gate array (PGA), a field programmable gate array (FPGA), etc.

In the description of the present disclosure, it should be understood that terms such as "first" and "second" are used herein for purposes of description and are not intended to indicate or imply relative importance or significance or to imply the number of indicated technical features. Therefore, the feature defined with "first" and "second" may include one or more of this feature. In the description of the present disclosure, unless specified otherwise, "a plurality of" means two or more than two, such as two or three.

In the present disclosure, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications or inner interactions of two elements.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. Thus, the appearances of above phrases in various places throughout this specification are not necessarily referring to the same embodiment or example of the present disclosure. Furthermore, the particular features, structures, materials, or characteristics may be combined in any suitable manner in one or more embodiments or examples.

What is claimed is:

1. A method for identifying a starting state of a motor, comprising:
   sampling back electromotive forces of any two phases of the motor and calculating a line back electromotive force according to the back electromotive forces of the two phases;
   acquiring a polarity flag of the motor; and
   determining the starting state of the motor according to the polarity flag and the line back electromotive force.

2. The method according to claim 1, wherein determining the starting state of the motor according to the polarity flag and the line back electromotive force comprises:
   calculating a sum of the back electromotive forces of the two phases as a SumP if the polarity flag is positive and the line back electromotive force is smaller than 0 in a first pre-set period;
   calculating a sum of the back electromotive forces of the two phases as a SumN if the polarity flag is negative and the line back electromotive force is greater than 0 in a second pre-set period, in which the second pre-set period is equal to the first pre-set period;
   determining the starting state of the motor according to a magnitude relationship between the SumP and the SumN.

3. The method according to claim 2, wherein determining the starting state of the motor according to a magnitude relationship between the SumP and the SumN comprises:
   determining that the motor is in a downwind starting state if the SumP is greater than the SumN;
   determining that the motor is in an upwind starting state if the SumP is smaller than the SumN.

4. The method according to claim 3, further comprising:
   calculating a starting rotation speed of the motor according to a sampling frequency and the number of sampled samples in a third pre-set period or the number of sampled samples in a fourth pre-set period, to identify a rotation speed of the motor before the motor is in the downwind starting state or the upwind starting state.

5. The method according to claim 4, wherein the starting rotation speed of the motor is calculated with a following formula:

$$\text{Speed}=1/(N*(1/fs)),$$

in which Speed is the starting rotation speed of the motor, N is the number of the sampled samples, and fs is the sampling frequency.

6. The method according to claim 2, wherein determining the starting state of the motor according to the polarity flag and the line back electromotive force further comprises:
   determining that the motor is in a stationary starting state if an absolute value of the line back electromotive force is smaller than a first pre-set value in a fifth pre-set period.

7. A device, comprising:
   one or more processors;
   a memory;
   one or more programs stored in the memory that, when executed by the one or more processors, cause the one or more processors to perform a method for identifying a starting state of a motor according to claim 1.

8. A computer storage medium having stored therein one or more programs that, when executed by a device, cause the device to perform a method for identifying a starting state of a motor according to claim 1.

9. An apparatus for identifying a starting state of a motor, comprising:
   a sampling device configured to sample back electromotive forces of any two phases of the motor,
   a first calculating device coupled to the sampling device and configured to calculate a line back electromotive force according to the back electromotive forces of the two phases;
   an acquiring device configured to acquire a polarity flag of the motor; and
   a determining device coupled to the first calculating device and the acquiring device respectively and configured to determine the starting state of the motor according to the polarity flag and the line back electromotive force.

10. The apparatus according to claim 9, wherein when the starting state of the motor is determined according to the polarity flag and the line back electromotive force by the determining device, the determining device is configured to:
    calculate a sum of the back electromotive forces of the two phases as a SumP if the polarity flag is positive and the line back electromotive force is smaller than 0 in a first pre-set period;
    calculate a sum of the back electromotive forces of the two phases as a SumN if the polarity flag is negative and the line back electromotive force is greater than 0 in a second pre-set period, in which the second pre-set period is equal to the first pre-set period;
    determine the starting state of the motor according to a magnitude relationship between the SumP and the SumN.

11. The apparatus according to claim 10, wherein when the starting state of the motor is determined according to the magnitude relationship between the SumP and the SumN by the determining device, the determining device is configured to:
    determine that the motor is in a downwind starting state if the SumP is greater than the SumN;
    determine that the motor is in an upwind starting state if the SumP is smaller than the SumN.

12. The apparatus according to claim 11, further comprising:
    a second calculating device coupled to the sampling device and configured to calculate a starting rotation speed of the motor according to a sampling frequency and the number of sampled samples in a third pre-set period or the number of sampled samples in a fourth pre-set period, to identify a rotation speed of the motor before the motor is in the downwind starting state or the upwind starting state.

13. The apparatus according to claim 12, wherein the second calculating device is configured to calculate the starting rotation speed of the motor with a following formula:

$$\text{Speed}=1/(N*(1/fs)),$$

in which Speed is the starting rotation speed of the motor, N is the number of the sampled samples, and fs is the sampling frequency.

14. The apparatus according to claim 10, wherein the determining device is further configured to determine that the motor is in a stationary starting state if an absolute value of the line back electromotive force is smaller than a first pre-set value in a fifth pre-set period.

15. A motor, comprising an apparatus for identifying a starting state of a motor according to claim 9.

* * * * *

UNITED STATES PATENT AND TRADEMARK OFFICE
CERTIFICATE OF CORRECTION

PATENT NO. : 10,505,474 B2  
APPLICATION NO. : 16/177390  
DATED : December 10, 2019  
INVENTOR(S) : Zhang et al.

Page 1 of 1

It is certified that error appears in the above-identified patent and that said Letters Patent is hereby corrected as shown below:

On the Title Page

(30) Foreign Application Priority Data should read:  
Jul. 28, 2016    (CN)..........................................201610616430.5

Signed and Sealed this  
Sixth Day of October, 2020

Andrei Iancu  
*Director of the United States Patent and Trademark Office*